Aug. 26, 1930.  A. SUTHERLAND  1,774,300
PORTABLE PULSATOR FOR MILKING SYSTEMS
Filed June 7, 1926  2 Sheets-Sheet 1
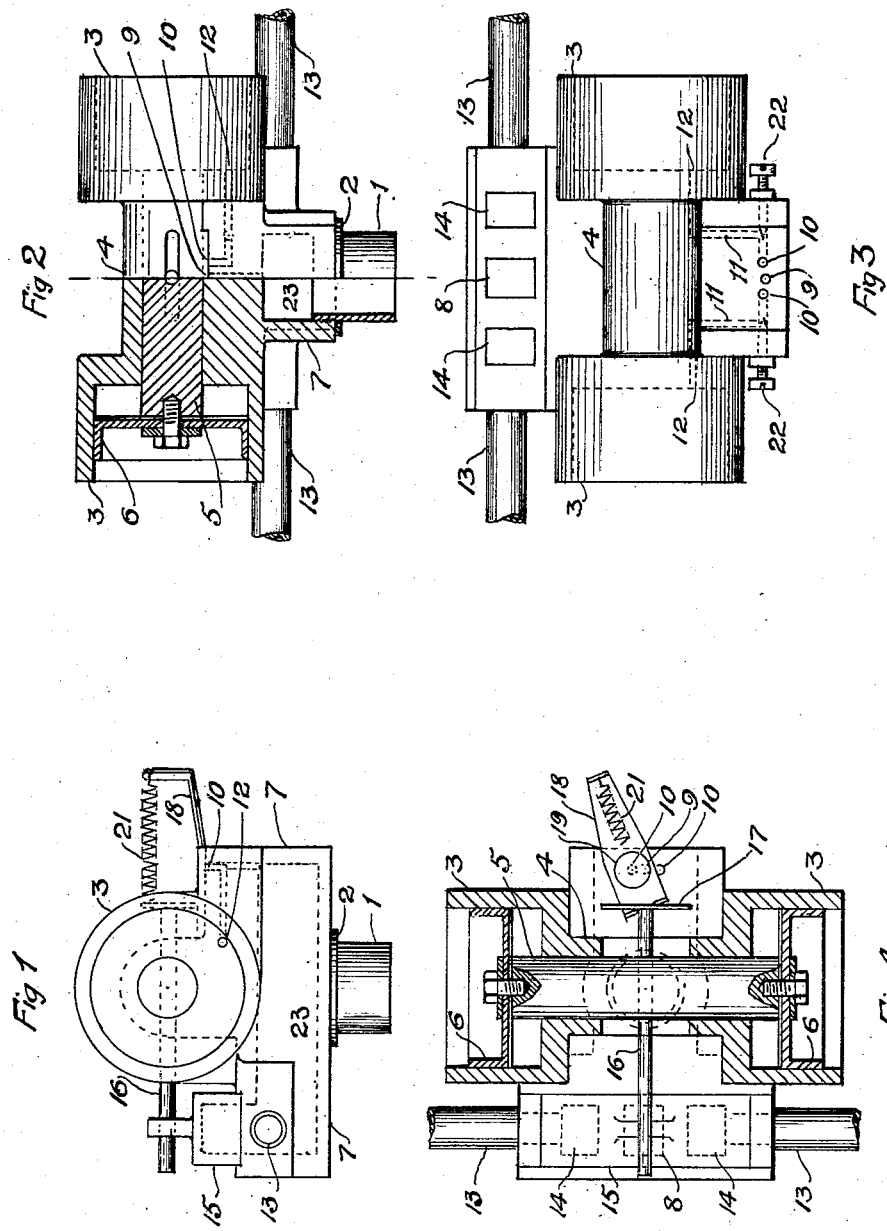
Angus Sutherland.
Inventor
by T. L. Boyden.
Attorney.

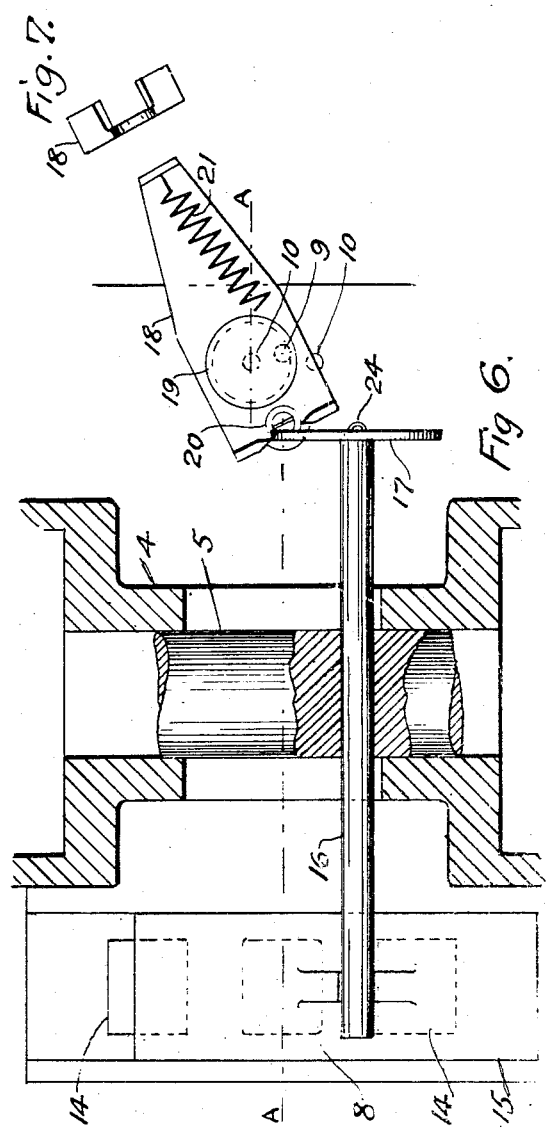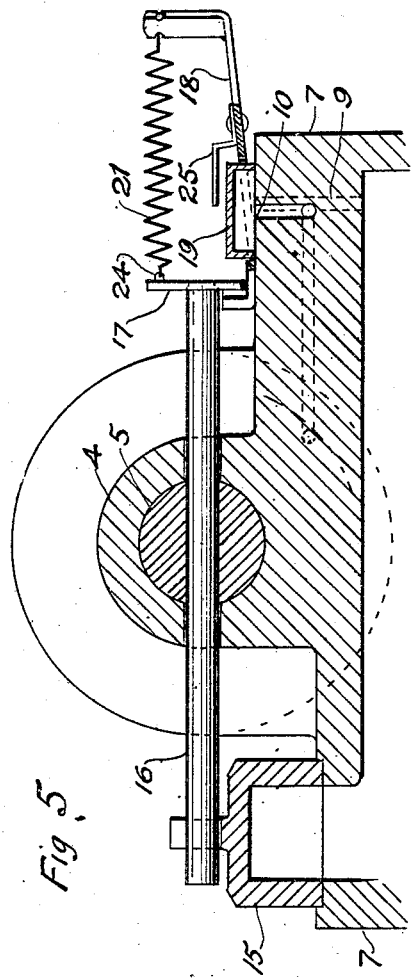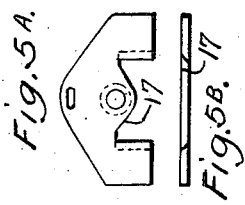

Patented Aug. 26, 1930

1,774,300

UNITED STATES PATENT OFFICE

ANGUS SUTHERLAND, OF VANCOUVER, BRITISH COLUMBIA, CANADA

PORTABLE PULSATOR FOR MILKING SYSTEMS

Application filed June 7, 1926. Serial No. 114,217.

This invention relates to pulsators or devices for obtaining a periodic pulsation or change of pressure in pipe lines, tanks or containers of liquids or gaseous fluids.

In all pulsators as at present constructed, the maximum proportion of the pulsation cycle in which suction or vacuum conditions are obtainable is one half, and thus the remainder of the period, during which the atmospheric pressure obtains and during which the operation of squeezing the milk from the cow is effected, is never less than 50 per cent of the total time-cycle.

In the machine hereafter described this suction period can be lengthened at will relatively to the whole time-cycle, the remainder of the time-cycle being proportionately reduced and thus a short squeeze can be readily obtained in the actual milking operation, which greatly increases the milking efficiency of the machine.

Referring to the drawings annexed Fig. 1 shows an end view or elevation of the machine; Fig. 2, a side view partly in section; Fig. 3, a plan with the valve mechanism removed; Fig. 4, a sectional plan showing the valve mechanism; Figs. 5 and 6 show this mechanism to a larger scale.

Figure 5A is a front elevation of engagement plate 17, and

Figure 5B is a bottom end view of the engagement plate 17 showing the bevelled edges of the aperture.

Figure 7 is an end view of the oscillating plate 18 shown in plan in Fig. 6.

The drawings show a portable pulsator designed for the purpose of application to mechanical milking systems. It is operated by a vacuum or negative pressure in a pipe line, and is connected thereto by inserting the tube or ferrule 1 in an aperture in the vacuum line. The weight of the device, in combination with a washer 2 of soft material interposed between the pulsator and the vacuum pipe, seals the joint when the device is placed in position.

The device consists of two open ended cylinders 3 in axial alignment, having their adjacent ends inter-connected by a tubular member or cylinder of smaller diameter. A central plunger 5 can move longitudinally in the cylinder 4, and carries on each end a piston and cup leather 6 which fits and moves in cylinders 3.

The hollow base or vacuum chamber 7 is cast integrally with the cylinders 3 and 4 and extends on one side to form a flat surface containing three ports or apertures 8 and 14 (Figs. 3, 4 and 6) and on the other side a surface containing three circular ports or apertures 9 and 10 (Figs. 3, 4 and 6).

The port 8 is in communication with the central chamber 23 of base 7, as is also the hole or circular port 9. The ports 14 are each in communication with the fluid, or in this case, milk line pipe 13. The holes or ports 10 are in communication with the holes or apertures 12 (Fig. 1) in the inside face of the cylinders 3.

The ports 14 and 8 (Figs. 3, 4 and 6) are covered by a main D-slide valve 15 (Figs. 1, 5 and 6) which is moved backwards and forwards by the rod 16 carried by the central plunger 5 (Figs. 2, 4 and 6), to which it is rigidly connected. The movement of 16 is provided for by slotting the sides of the cylinder 4 (Figs. 2 and 5) where the rod passes through.

The other end of this rod 16 ends in an engagement plate 17 (Fig. 5) which locks an oscillating plate 18 pivoted and moving about a fulcrum 20 (Fig. 6) and carrying a controlling valve 19 (Figs. 4, 5 and 6) which is capable of covering two out of the three ports 9, 10 and 10 which are arranged so as to be covered by its traverse.

The oscillating plate 18 carries a guard 25 (Fig. 5) to prevent the valve 19 from being displaced, and the end of the plate 18 is turned up to form an anchor for the tension or toggle spring 21, the other end of which is anchored at 24 to the engagement plate 17. The said engagement plate moves backwards and forwards in a direction parallel to the axis of the cylinder 4 when the plunger 5 and rod 16 are in motion.

At each end of this motion the plate 17 unlocks the oscillating plate 18, and the resulting spring tension causes this plate to swing in the same direction as the travel of the rod 16, thus moving the valve 19 and connecting the port 9 with the other of the two ports 10 and thus reverse the motion of the plunger 5. The mechanism, as shown in Fig. 6, is about to unlock the plate 18.

The action of the device is as follows: The machine being placed on a vacuum line by means of the connecting ferrule 1, a vacuum is created in the inside chamber 23 of the base 7, and this vacuum communicates, by means of the port 9, and one of the ports 10 (whichever one is covered at the moment by the control valve 19) with the corresponding port 12, in the inside of one of the cylinders 3. One of the pistons 6 then commences to move inwards carrying the central plunger 5, with the rod 16, and thus moving the main slide valve 15 in its relation to the ports 14 and 8. The central port 8 is in communication with the central chamber 23 of the base 7 and when either of the ports 14 are put in communication with 8 by the D-slide valve, a momentary vacuum is provided in the pipe 13 connected to the port 14.

The outer edge of one of the end ports 14 is at some stage of the travel uncovered by the slide valve 15, and the vacuum condition in the pipe 13 communicating with it is broken, the atmospheric pressure being regained. And obviously, by reducing the over-all length of the slide valve 15, the period of time during which each branch of the pipe 13 is subject to vacuum conditions is reduced, or the period of "suction" shortened.

Conversely, it is also to be noted that there are periods when the slide valve 15 covers all three of the ports 14, 8, and 14 simultaneously, under which condition a partial vacuum is existent in the vacuum chamber and both the pipes 13.

From a consideration of the above sequence of operations it will be obvious that the delivery pipes may be subjected to a vacuum condition for any desired period greater than one-half of the total time-cycle of the pulsation.

The velocity of travel of the leather plungers, and consequently the rate of periodic change in the pressure conditions in the pipes 13, can be controlled by throttling the area of the passages 11 by means of the valves 22 or other suitable means.

Thus the time-cycle of pressure change is under control by the valves 22 and the portion of that cycle occupied by the suction condition in the pipe 13 is independently controlled by the length of the main slide valve 15, which is so attached as to be easily disconnected and replaced by a valve of different length, thus altering the instant at which the ports 14 are uncovered, and therefore, the duration of vacuum or suction condition in the pipes 13.

Having now particularly described my invention, I declare that what I claim is:

1. In combination with a portable pulsator for a milking apparatus, a pair of cylinders in axial alignment having their outward ends open and their adjacent ends connected, a piston in each said cylinder, a rod in axial alignment with and connecting the said pistons, two slide valves both of the sliding cover type and working on surfaces which are in a plane parallel with the axis of said cylinders, a vacuum inlet port communicating with the two said slide valves, the two said slide valves each having three ports and having their middle port communicating with the said vacuum inlet, one of the said slide valves having its exterior ports in communication with pipe connecting means and being adapted to cover the said middle port and one or both of the said outer ports simultaneously so that the vacuum condition existing in the vacuum chamber can be transmitted to and maintained in both exterior ports and their connections for any desired portion of the pulsation time cycle according to the lap of the said valve, means whereby the movement of said pistons is adapted to reciprocate the said slide valves to secure any desired portion of the pulsation time cycle.

2. In a reciprocating pulsator of the type described in which the rate of pulsation is controlled by one slide valve and the relative duration of the vacuum and release periods is controlled by a second slide valve the combination comprising, a central transverse pin integral with the reciprocating members of said pulsator and adapted to motivate said slide valves, a flange secured right-angularly of the axis and to the extremity of said pin, a pivoted slide valve oscillating in a plane parallel to the said axis and having upwardly turned projections corresponding and facing each other on the inward extremity of said pivotal slide valve, corresponding but downward projections on the said flange adapted to engage the recess between and formed by the said upwardly turned projections, an extension spring secured to said flange and to the outer extremity of said oscillating slide whereby when the axes of the said pin and the said spring are not in alignment a tension is exerted on the said spring tending to oscillate the said valve on its pivot, stops limiting the oscillation of said slide valve, the recess between the two said upwardly turned projections being so shaped that the corresponding downward projections of said flange may slide between them when the said slide valve is in either extreme angular position and that when the extreme position of said slide and said flange are almost in maximum opposition thereby exerting a maximum tension on said spring one of said downward projections engages the said recess in the oscillating slide valve thereby permitting the valve to move pivotally and release the tension on the spring.

In testimony whereof I affix my signature.

ANGUS SUTHERLAND.